Feb. 17, 1948. A. E. KREMILLER 2,436,009
THERMAL COMPENSATOR FOR HYDRAULIC SYSTEMS
Filed Sept. 14, 1943 2 Sheets-Sheet 1

Inventor
ARTHUR E. KREMILLER
By R. S. Berry
Attorney

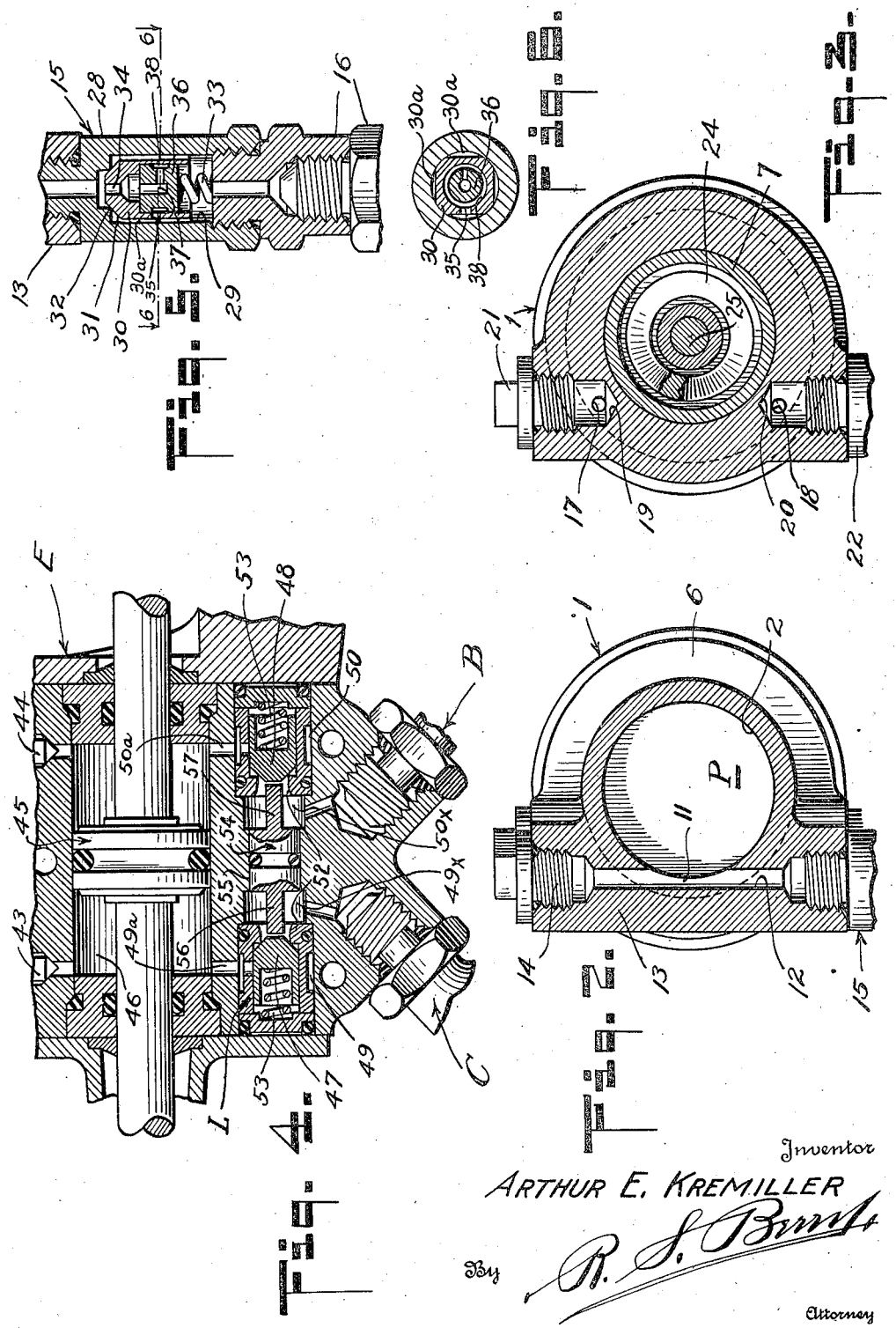

Patented Feb. 17, 1948

2,436,009

UNITED STATES PATENT OFFICE 2,436,009

THERMAL COMPENSATOR FOR HYDRAULIC SYSTEMS

Arthur E. Kremiller, Glendale, Calif., assignor to Adel Precision Products Corp., a corporation of California Application September 14, 1943, Serial No. 502,343

6 Claims. (Cl. 138—31)

This invention relates in general to hydraulic power systems of the closed, manually operated, dual line, type for controlling the engines and other mechanisms of aircraft, and more particularly pertains to and has for an object the provision of an improved compensator-accumulator which as a small, compact and light weight unit may be embodied in such a system to compensate for thermal expansion and contraction and maintain the proper volume of fluid throughout the system under variable temperatures, with the added advantage of placing the fluid under such an initial pressure as will reduce sluggishness of response, exclude air, and render the system more reliable and efficient.

Another object of my invention is to provide a device of the character described wherein concentric cylinder bores in a single housing together with a dual coaxial piston unit operable therein under spring loading, affords the advantages hereof with a marked simplicity and inexpensiveness of construction, a minimum of parts and costly machining operations and provides separate compensating chambers of equal volume, each for connection to a cylinder line of the dual line system. With this arrangement the two lines are equally affected by temperature change and as the temperature increases in one line, the same expansion space is provided for the identical increase in temperature in the other line, whereby an accurate volume compensation action throughout the system is afforded at all times.

A further object of this invention is to provide a spring loaded compensator such as described with which is associated one-way restrictor or "snubber" valves to take care of surges caused by sudden operation of the system. These valves restrict the flow to the compensator from the cylinder lines of the associated system, under working pressures greater than the load of the compensator spring and which are created at maximum hand load operation of the system, but allow the slow flow of fluid due to expansion and contraction to leak past them when the system is not under operation, whereby the compensator will be operative to maintain the proper volume of fluid throughout the system in accordance with the provisions hereof.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 2 is an enlarged cross sectional view taken on the line 2—2 of Fig. 1;

Fig. 3 is an enlarged sectional view taken on the line 3—3 of Fig. 1;

Fig. 4 is an enlarged fragmentary longitudinal sectional view of the slave or motor unit shown in Fig. 1;

Fig. 5 is an enlarged fragmentary vertical sectional view of one of the one-way restrictor valves associated with the compensator unit shown in Fig. 1.

Fig. 6 is a transverse sectional view taken on the line 6—6 of Fig. 5.

Figure 1:
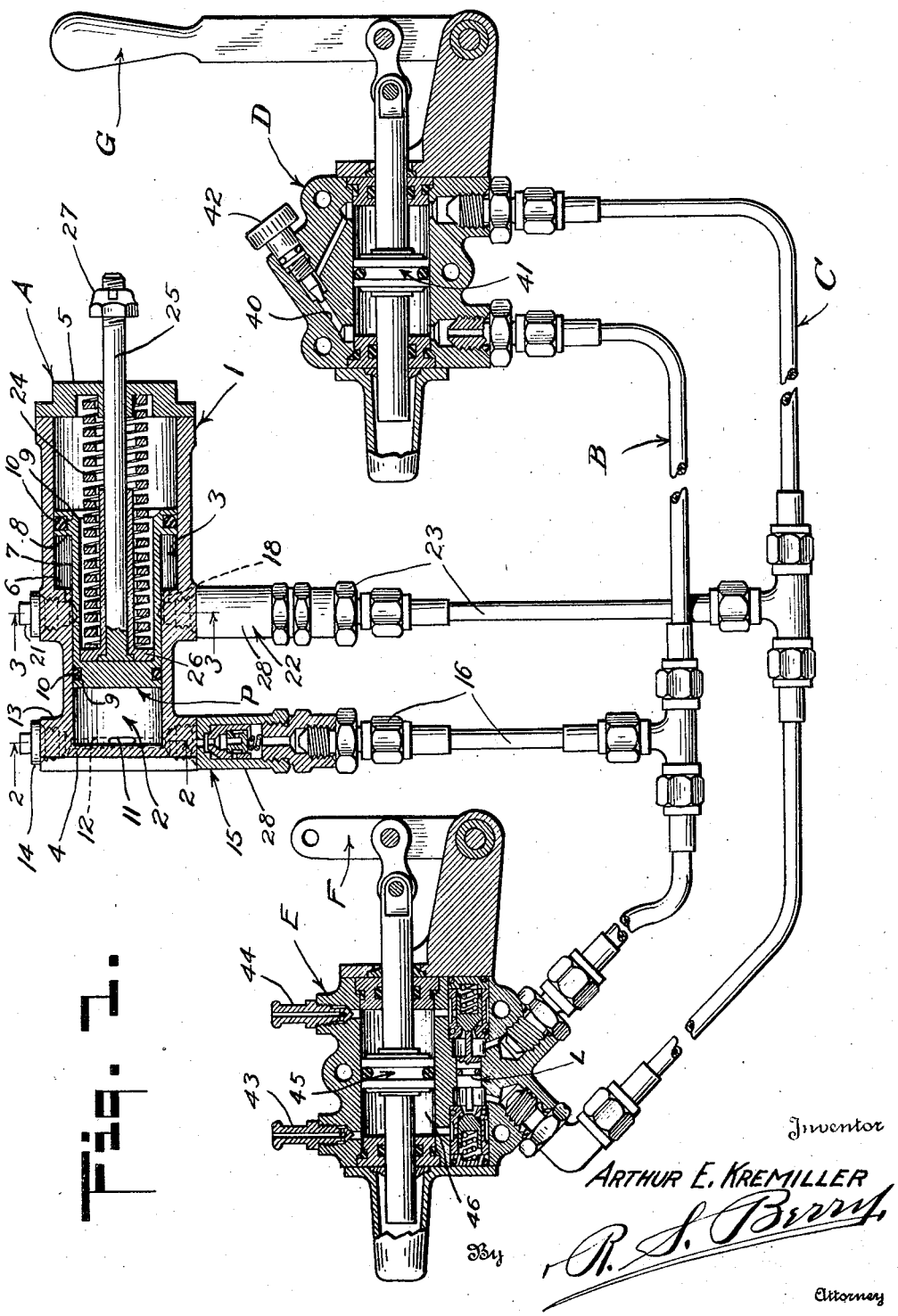
Fig. 1 is a semi-schematic view of a manually operated remote control hydraulic system embodying the present invention and showing in longitudinal section the main units of the system.

Referring to the drawings more specifically it is seen that my invention takes into consideration the provision of a remote control hydraulic system wherein my temperature change compensator-accumulator unit generally designated A is connected to the system fluid lines B and C extending between a manually operable transmitter or pump unit D and a motor or slave unit E. The unit E is provided with a crank arm or other suitable means F affording an operative connection in any suitable manner with the aircraft engine, device or mechanism (not shown) which is to be operated upon manipulation of the handle G of the pump unit D and the response of the motor or slave unit E. The unit A embodying my invention operates as will be hereinafter more fully described to provide an effective initial fluid pressure in the closed system and maintain the proper volume of fluid therein in compensation for fluid displacement brought about by thermal expansion and contraction of the fluid and fluid lines and by minor leaks.

Referring now to the compensator unit A, it is seen that it includes a generally cylindrical housing 1 having concentric cylinder bores 2 and 3 of different diameters but of substantially equal lengths between the housing end walls 4 and 5. The cylinder bore 3 is of greater diameter than the bore 2 and defines an annular wall 6 at the juncture of the two bores.

Reciprocably mounted in the housing 1 is a hollow dual piston unit P consisting of a main piston portion 7 having a working fit in the smaller cylinder bore 2, and a second piston portion 8 having a working fit in the larger cylinder bore 3 and formed as an annular enlargement of the skirt end of portion 7. These piston portions are provided with ring grooves 9 containing rubber or synthetic rubber sealing rings 10 of circular cross section. This arrangement of coaxial bores and piston portions provides in said bores separate compensating chambers of equal capacity.

The cylinder bore 2 is intersected as at 11 as shown in Fig. 2 by a port 12 extending transversely through an enlargement 13 on one side of the housing. One end of this port is closed by a plug 14 while a one-way restrictor valve generally designated 15 is fitted to the other end of the port. Fittings 16 provide for connection of the valve 15 and the cylinder bore 2 to the line B of the system.

In the annular wall 6 between the bores 2 and 3 are axially extending ports 17 and 18 affording communication of the cylinder bore 3 with socket bores 19 and 20 which latter extend transversely of the cylindrical wall of the housing 1 and into said annular wall so as to intersect the ports 17 and 18 respectively. A plug 21 closes the outer end of socket bore 19 and on removal thereof, also the plug 14, the cylinder bores 2 and 3 and the system may be filled with hydraulic fluid.

Connected with the socket bore 20 is a one-way restrictor valve 22 corresponding to the valve 15 and coupled to the system line C by means of fittings 23, thereby affording communication of the cylinder bore 3 with the line C.

The piston unit P is loaded by means of a spring 24 so that the piston portions 7 and 8 are urged towards the ports 12 and 18 leading into the bores 2 and 3. This spring exerts a force so that the fluid in the bores 2 and 3 and in the system is under pressure while the system is static, thereby "solidifying" or "holding compressed" fluid columns of the system to eliminate sluggishness of action, also more effectively exclude air from the system. This initial pressure may be, for example, approximately 750 pounds per square inch or more or less depending on the particular system and the load thereon and provided the particular initial pressure is sufficient to effect the "solidification" or an appreciable initial compression of the fluid when the system is "static," as otherwise this "slack" must be taken up by manipulation of the pump unit and the initial action of the system is therefore sluggish as to transmission of power from the pump unit to the slave unit.

As here provided the spring 24 is interposed between the end wall 5 of the housing 1, and the piston unit P, being mounted on and surrounding a rod 25 having a head 26 seated in the hollow piston unit. This rod is extended through the end wall 5, has a nut 27 on its outer end, and not only serves to hold the spring in place in assembling and disassembling the compensator unit but acts as an indicator to show for the benefit of the operator, the position of the piston unit, since it moves in exact correspondence with said piston.

The one-way restrictor valves 15 and 22 are of identical construction and arrangement and their purpose is to restrict the flow of fluid from the cylinder lines B and C to the compensator during operation of the system and to allow the relatively slow thermally caused flow of fluid therethrough to and from the compensator unit when the system is static. The restriction of flow from the lines B and C to the compensator is necessary inasmuch as the maximum pressure developed during manipulation of the pump or transmitter unit D exceeds that of the compensator spring and unless the compensator is substantially "cut-off" from the lines B and C by such flow restriction, the high working pressures in said lines will move the compensator piston and retard and reduce the transmission of power from the pump or transmitter unit to the motor or slave unit.

Each of the one-way restrictor valves as best shown in Fig. 5 includes a cylindrical housing 28 through the bore 29 of which fluid passes to and from the compensator unit and in which bore a hollow valve member 30, which is square in cross-section except for chambered corners, has a working fit. A conical end wall 31 of the valve member 30 seats on a seat 32 located adjacent the compensator connected end of the bore 20. A light spring 33 urges the valve member against its seat.

A radial port 35 through the cylindrical wall of the valve member 30 and an axial port 34 through the center of the conical end wall 31 provide for flow of fluid through the valve when the latter is seated, the port 35 communicating with one of four passages 30a between the corner portions of said valve. This flow past the seated valve 30 is restricted by means of a plug 36 tightly fitted in the bore of the valve so as to lie in part between the valve ports 34 and 35. An L-shaped port 37 in the plug 36 has one end open opposite the axial port 34 and the other end open to the port 35 so that fluid may pass through the plug. In this connection it should be noted that the plug 36 is provided with a shallow circumferential groove 38 which intersects one end of the L-shaped port 37 and acts as a "metering" chamber for fluid passing through the seated valve. When this valve is open the fluid passes out freely through the passages 30a between its corner portions. Under severe over-load it is possible that a slight amount of fluid will be forced through this valve into the accumulator thus compressing the accumulator spring slightly with an incident lag in the slave element. When the movement has been completed and the working load removed from the system, the accumulator piston will quickly move forward unseating the valve and restoring the system to synchronism. Additionally, when filling the system through the filling plugs 14 and 21 in the accumulator there would be insufficient capacity in the restrictor passage to permit the quick filling of the system. Therefore, under those conditions, the pressure of the fluid being supplied to the system will unseat the valves 30 to permit the free flow of fluid from the accumulator into the rest of the system. The annular grooves 38 are of such shallow proportion as to form a very decided flow restricting device. As a matter of fact, they are only a few thousandths of an inch in depth.

When the system is in operation, the fluid must pass between valve 30 and the cylindrical wall of the restrictor valve unit, thence through port 35, shallow-groove 38, L-shaped port 37 and out through valve port 34 before it can enter the compensator, and this passage to the compensator is so small and tortuous that it will decidedly restrict the flow. Therefore this flow is too small to cause an appreciable movement of the compensator piston unit P. Thus it is seen the one-way restrictor valves operate to substantially "shut-off" communication between the system lines and the compensator while the system is being operated, so that the pressures developed during such operation will be prevented from actuating the accumulator piston unit. However, when the system is not under operation the spring loaded compensator pressurizes the system and the pressure on both sides of the valve members 30 of the two one-way restrictor valves is the same. The light springs 33 now hold the valve members 30 of these units seated. Any thermal expansion or contraction flow of the fluid in the system is relatively slow and will leak through these valves sufficiently to allow the compensator piston unit to be moved whereby the compensator acts to displace or receive fluid so that the proper volume of fluid is maintained throughout the system regardless of temperature changes.

With reference to Fig. 1, it is seen that pump or transmitter unit D is provided with a by-pass 40 around the piston 41 and controlled by a needle valve 42 thereby permitting of synchronization of the system as is customary in this art.

Figs. 1 and 4 show the motor or slave unit E as provided with bleeder valves 43 and 44 on opposite sides of the piston 45 therein. These valves are unscrewed to open opposite ends of the cylinder 46 to the atmosphere whereby air may be bled from the system and if desired the system may be filled by removing these valves and introducing the fluid through the one of the ports thus provided.

As here shown (see Figs. 1 and 4) the motor or slave unit E is provided with a hydraulic locking means generally designated L to prevent externally applied loads on the slave unit from affecting the system, also lock the slave unit and mechanism controlled thereby against any undesired or unintentional movement from positions gained responsive to actuation of the system. This hydraulic locking means is best shown in Fig. 4 and comprises valves 47 and 48 to control fluid flow through passages 49a and 50a leading through the walls of the slave unit cylinder 46 to opposite ends of said cylinder. These valves seat against seat members 52 in the passages 49 and 50 and are held against their seats by means of springs 53 and in such manner that they will open responsive to pressure of fluid delivered thereto from the lines B and C. A valve-operating piston 54 is reciprocable in a cylinder bore 55 in the wall of cylinder 46. This cylinder bore is common to the valves 47 and 48 and arranged so that the piston 54 will move responsive to fluid entering the cylinder from either of the lines B and C. The piston 54 has projections 56 and 57 on opposite ends for engaging and unseating the valves 47 and 48. The cylindrical passages 49 and 50 are diametrically reduced at 49x and 50x.

When fluid under pressure derived from the unit D enters the cylinder bore 55 in unit E, for example, through line C, it unseats valve 47 and enters the left end of the cylinder 46 and moves the piston 45 to the right. At the same time, the valve-operating piston 54 moves to the right and the projection 57 thereon engages and unseats the valve 48 thereby allowing a return flow of fluid from cylinder 46 to unit D through the other line B. Upon cessation of operation of unit D, the springs 53 close the valves 47 and 48, the spring for valve 48 then returning the piston 54 to the neutral position shown in Figs. 1 and 4. As the valves 47 and 48 are now seated, the slave unit piston P is hydraulically locked against movement as a result of any externally applied load on the slave unit.

When working fluid is delivered to the slave unit E through the line B the valve 48 is opened by the pressure of the fluid and the valve-operating piston 54 is moved to the left thereby opening the valve 47. The main piston 45 now moves to the left and in all other respects the slave unit D operates in the same manner as previously described upon cessation of this reverse operation of the pump unit D.

It is now apparent that while the system is under operation the flow of fluid to the compensator is so restricted by the one-way restrictor valves of my improved compensator unit A as to render the action of this unit practically negligible. However, when the system is static, that is, not under operation, the force of the spring in the compensator unit A is effective to maintain the system under pressure and compensate for expansion and contraction of the fluid and fluid lines in the manner hereinbefore set forth, whereby the system is maintained in condition to be fully and instantly responsive to the manual operation of the transmitter or pump unit, without the objections which have been present in closed, remote control, dual line systems as heretofore used and which have not had the benefit of my improved dual-cylinder-dual-piston compensator embodying the features of construction and operation described and illustrated herewith.

In order to obtain the necessary precise response and continued accurate positioning of the motor or slave unit E to the operation of the transmitter or pump unit D, it is necessary that there be no by-pass connection of any kind (even of a greatly restricted character) between the conduits B and C. Therefore it is necessary to provide the compensator unit A with the two chambers 2 and 3 each of which is connected with one only of the two power transmitting conduits.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a compensator for a dual fluid line hydraulic system, a housing closed at its ends and having coaxial cylinder bores one of which is of greater diameter than the other, means affording the communication of said bores with the fluid lines of the system including ports leading into said bores, a dual piston unit separating the bores in said housing and having connected and coaxial piston portions movable in said bores toward and away from said ports, and means in said housing for urging said piston portions toward said ports and maintaining under pressure fluid contained in said bores between said piston portions and said ports, said piston unit being hollow and receiving a portion of said means in the hollow thereof.

2. In a compensator for a dual fluid line hydraulic system, a housing closed at its ends and having coaxial cylinder bores one of which is of greater diameter than the other, means affording the communication of said bores with the fluid lines of the system including ports located adjacent corresponding ends of said bores, a dual piston unit separating the bores in said housing and having connected and coaxial piston portions movable in said bores toward and away from said ports, means in said housing for urging said piston portions toward said ports and maintaining under pressure fluid contained in said bores between said piston portions and said ports, and a rod arranged to move in correspondence with said piston unit and projecting through said end of said housing as an indicator to show the position of the piston unit.

3. In a compensator for a dual fluid line hydraulic system, a housing closed at its ends and having coaxial cylinder bores one of which is of greater diameter than the other, means affording the communication of said bores with the fluid lines of the system including ports located adjacent corresponding ends of said bores, a dual piston unit separating the bores in said housing and having connected and coaxial piston portions movable in said bores toward and away from said ports, a spring interposed between said piston unit and an end of said housing for urging said piston portions toward said ports and maintaining under pressure fluid contained in said bores between said piston portions and said ports, said piston unit being hollow and receiving a portion of said spring in the hollow thereof, a rod in said hollow of the piston and extending from the piston unit out through said end of said housing, and a head on the inner end of said rod engaging the head of the piston unit interiorly of the latter, said spring surrounding said rod and having one end rested against the head on said rod.

4. In a compensator for a dual fluid line hydraulic system, a housing closed at its ends and having coaxial cylinder bores one of which is of greater diameter than the other, means affording the communication of said bores with the fluid lines of the system including ports located adjacent corresponding ends of said bores, a dual piston unit separating the bores in said housing and having connected and coaxial piston portions movable in said bores toward and away from said ports, and means in said housing for urging said piston portions toward said ports and maintaining under pressure fluid contained in said bores between said piston portions and said ports, said bores having substantially equal fluid capacity between said corresponding ends and the piston portions therein, whereby given increments of piston movement effect equal volumetric displacement of fluid from each of said housing bores.

5. In a compensator for a dual fluid line hydraulic system, a housing closed at its ends and having coaxial cylinder bores one of which is of greater diameter than the other, means affording the communication of said bores with the fluid lines of the system including ports leading into said bores, a dual piston unit separating the bores in said housing and having connected and coaxial piston portions movable in said bores toward and away from said ports, means interposed between said piston unit and an end of said housing for urging said piston portions toward said ports and maintaining under pressure fluid contained in said bores between said piston portions and said ports, and means associated with said ports for rendering the piston unit substantially unresponsive to the pressure of the working fluid in the system when the latter is under operation and which allows a compensating flow of fluid through said ports and renders the dual piston unit responsive to such compensating flow incident to thermal contraction and expansion of the fluid while the system is not under operation, said last named means including valves seating in the direction of flow from the lines to said ports and having provisions for restricted flow of fluid therethrough when seated.

6. In a compensator for a dual fluid line hydraulic system, a housing closed at its ends and having coaxial cylinder bores one of which is of greater diameter than the other, means affording the communication of said bores with the fluid lines of the system including ports leading into said bores, a dual piston unit separating the bores in said housing and having connected and coaxial piston portions movable in said bores toward and away from said ports, means interposed between said piston unit and an end of said housing for urging said piston portions toward said ports and maintaining under pressure fluid contained in said bores between said piston portions and said ports, said piston unit being hollow and receiving a portion of said piston urging means in the hollow thereof, and a rod in said hollow of the piston and extending from the piston unit out through said end of said housing, said piston urging means surrounding said rod and being operatively related thereto in such a manner as to cause the piston and rod to move in unison.

ARTHUR E. KREMILLER.

REFERENCES CITED

The following references are of record in the file of this patent:

UNITED STATES PATENTS

| Number | Name | Date |
|---|---|---|
| Re. 19,432 | Carroll | Jan. 22, 1935 |
| 375,674 | Greene | Dec. 27, 1887 |
| 1,707,781 | Blanchard | Apr. 2, 1929 |
| 1,786,912 | Madden | Dec. 30, 1930 |
| 1,911,634 | Madden | May 30, 1933 |
| 2,098,653 | Carroll | Nov. 9, 1937 |
| 2,148,268 | Kerr | Feb. 21, 1939 |
| 2,188,913 | Masteller | Feb. 6, 1940 |
| 2,192,175 | Ballard | Mar. 5, 1940 |
| 2,308,048 | Brown | Jan. 12, 1943 |

FOREIGN PATENTS

| Number | Country | Date |
|---|---|---|
| 519,099 | Great Britain | Mar. 15, 1940 |
| 776,645 | France | Nov. 8 1934 |